Oct. 20, 1942.   H. A. FABER   2,299,217
AIR TREATING APPARATUS
Filed Jan. 3, 1941
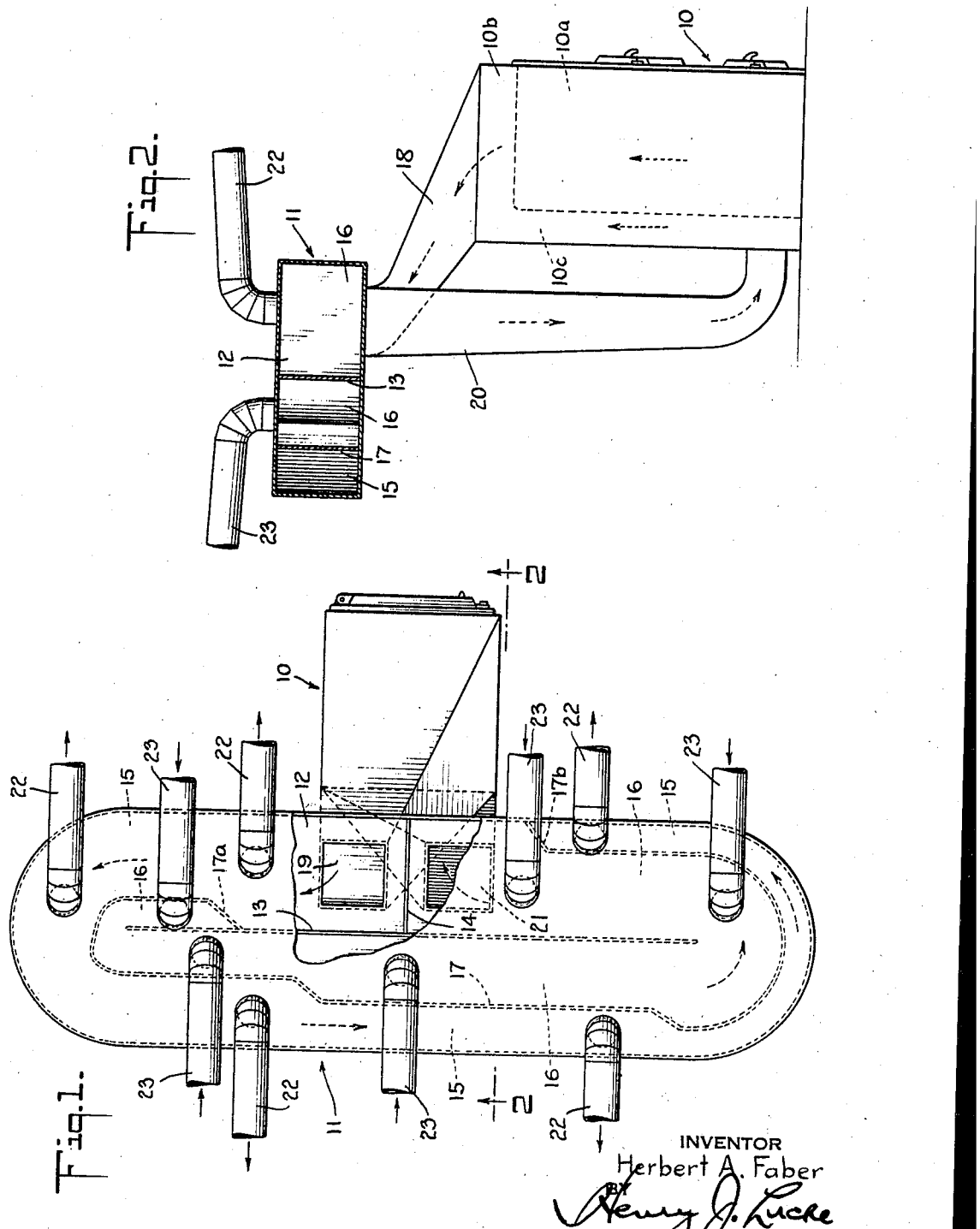
INVENTOR
Herbert A. Faber
BY
Henry J. Lucke
HIS ATTORNEY Patented Oct. 20, 1942

2,299,217

UNITED STATES PATENT OFFICE 2,299,217

AIR TREATING APPARATUS

Herbert Alfred Faber, Cincinnati, Ohio

Application January 3, 1941, Serial No. 372,964

3 Claims. (Cl. 98—33)

This invention relates to apparatus for treating air, thermally or otherwise, and for distributing the treated air in a predetermined manner.

The invention is especially significant in its application to warm air heating systems for buildings, wherein air from the building is drawn into a furnace for heat treatment, and is distributed throughout the building by a duct or conduit system after it has been heated. This is, however, only one of the possible applications of the invention. It may, for example, be applied advantageously to so-called air conditioning systems where the air is filtered and cooled, as well as other air treating systems.

An outstanding object of the invention is to provide apparatus of the type referred to wherein very efficient air distribution and air return is attained.

Another important object is to provide such apparatus in compact and inexpensive form.

In attaining the above objects of the invention a principal feature resides in the provision of a comparatively compact, box-like structure defining a chamber for collecting return air and for distributing treated air. This box-like structure is located adjacent the air treating device, and, especially in the case of warm air heating systems, may be very advantageously located immediately above the furnace with an air supply duct leading thereinto from the furnace and with an air return duct leading therefrom into the furnace. The box-like structure is interiorly partitioned to form independent ducts for treated air to be distributed and for return air, respectively. Air distribution conduits communicate with the air distribution duct at spaced intervals along its length, and air return conduits communicate with the return duct at spaced intervals along its length.

Another feature of the invention resides in the arrangement of the interior partitioning of the box-like structure so that the respective ducts are oppositely graduated in cross section, along their lengths for compensating volumetrically for in-flowing and out-flowing air.

This box-like structure, together with the interior partitioning thereof, in itself represents a very efficient unit for handling materials generally, as, for instance, various kinds of fluids undergoing treatment.

Other objects and features of the invention will become apparent from the following specific description of a preferred embodiment, considered together with the accompanying drawing.

In the drawing, which illustrates one embodiment of the invention in its application to a warm air heating system:

Fig. 1 represents a top plan view of the apparatus, showing particularly the furnace and the box-like structure which defines the air distribution and return chamber. A portion of the top wall of the box-like structure is broken away to reveal interior partitioning, and the remainder of the partitioning is illustrated by dotted lines;

Fig. 2 represents a vertical section taken on the line 2—2, Fig. 1, interior portions of the furnace being revealed by dotted lines.

The illustrated specific embodiment of the invention represents an especially advantageous application of the invention in practice. Compactness and efficiency of operation are greatly to be desired in warm air heating systems, and are provided for in an economical manner by the invention.

The reference number 10, in the drawing, indicates a warm air furnace, which may be of any conventional type wherein provision is made for passing return air over a heating unit and conducting the thus heated air from the furnace to the distributing means. In the present instance, the furnace 10 comprises a heating unit 10a and an enclosing casing 10b of sheet metal or the like defining an air chamber or passage 10c about the unit 10a.

The box-like structure, indicated by 11, is conveniently formed of sheet metal and is located adjacent the furnace 10, being disposed thereabove.

The box-like structure 11 defines a chamber 12 for distributing heated air from the furnace and for collecting air for return to the furnace. The chamber 12 is partitioned to form a ductway. The partition 13 extends along the length of the chamber 12, substantially mid-way of its width but short of its ends, and the partition 14 extends between the partition 13 and one of the side walls of the box-like structure 11 substantially mid-way of the length of the chamber. Thus, the duct-way comprehends the entire chamber 12, having a substantially uniform width along its length and being doubled upon itself so that its ends mutually abut at the partition 14.

For providing smooth flow of air within the chamber 12, it is preferable that the ends of the box-like structure 11 be rounded, as illustrated, and, for the sake of uniformity in air flow and symmetry in appearance, it is preferable that the furnace 10 be disposed substantially centrally of the length of the chamber 12.

Independent ducts 15 and 16 are formed in the chamber 12, along the duct-way provided therein, by means of partitioning structure 17, which commences, say, at 17a against the partition 13 and within one end portion of the duct-way, and continues along the length of the duct-way in gradually increasing proximity to the side walls of the box-like structure 11 until it terminates against a side wall of the box-like structure at a location within the other end of the duct-way, see 17b, thus gradually crossing the duct-way from one side to the other. It may be preferable to gradually increase the degree of proximity of the partition structure 17 to the side walls of the box-like structure 11 in substantially step formation, as illustrated, see Fig. 1.

The furnace 10 communicates with the above described independent ducts 15 and 16 of the box-like structure 11. For this purpose, the supply duct 18 leads from the top of furnace 10 into the duct 15 through a main inflow opening 19 located in the bottom wall of box-like structure 11 near the end of that end portion of the duct-way which is a part of duct 15; and duct 20 leads into the lower part of the furnace from a main outflow opening 21, formed in the bottom wall of box-like structure 11 near the end of that end portion of the duct-way which forms a part of duct 16. Duct 15, therefore, becomes the distributor of heated air to the distributing conduits of the system, and duct 16 becomes the collector of air returned through return conduits of the system.

The air distributing conduits 22 lead from the duct 15 at locations along the length thereof which are mutually spaced according to the requirements of the buildings to be heated and according to the design of the apparatus. Likewise, air return conduits 23 are spaced along the length of duct 16. The respective conduits lead in customary manner to various parts of the enclosure to be heated. It can be readily seen that, because of the oppositely graduated air supply and air return ducts 15 and 16, respectively, maximum flow efficiency will be obtained with minimum size requirements for the air distributing and return chamber 12.

If desired, a suitable air circulator or air circulators of any well known type (not shown) may be supplied at any suitable location in the system, as, for instance, in either the duct 18 or the duct 20 or both, etc., for causing forced circulation of air through the system.

It can be seen that the interiorly partitioned box-structure 11, provides, in itself, a very efficient device for handling materials in general. The oppositely graduated ducts, arranged as they are in a duct-way, which is curled upon itself, so to speak, within a compact chamber, compensate automatically for material flowing into and for material flowing from the chamber. The large ends of each duct, disposed as they are adjacent each other in the proximate end portions, respectively, of the duct-way permit the provision of a major inlet port and a major outlet port adjacent each other.

Whereas this invention has been specifically described with respect to only one preferred embodiment thereof, it is to be definitely understood that many changes may be made in the embodiment here specifically described, and many other embodiments may be made, without departing from the purview of the invention as set forth herein and in the claims which follow.

I claim:

1. Distributing and collecting means comprising a box having a bottom wall, a top wall, and a peripheral lateral wall, all of which collectively define a closed chamber; internal partition walls dividing said chamber into a single duct-way doubled upon itself so that its terminal ends are mutually adjacent; internal partition walls dividing said duct-way into two side-by-side ducts of oppositely graduated cross-sections, respectively, each running from large to small substantially mutually uniformly, the large ends of said ducts being located at the said terminal ends, respectively, of said duct-way; a main inflow opening leading into the large end of one of said ducts; a main outflow opening leading from the large end of the other of said ducts; subsidiary outflow openings leading from said one duct at intervals along the length thereof substantially in accordance with the graduated character thereof, and subsidiary inflow openings leading into said other duct at intervals along the length thereof substantially in accordance with the graduated character thereof.

2. A system for treating air comprising wall means defining an air-treating chamber; air distributing and collecting means disposed apart from said air-treating chamber and comprising a box having a bottom wall, a top wall, and a peripheral lateral wall, all of which collectively define a closed chamber, internal partition walls dividing said chamber into a single duct-way doubled upon itself so that its terminal ends are mutually adjacent, internal partition walls dividing said duct-way into two side-by-side ducts of oppositely graduated cross-sections, respectively, each running from large to small substantially mutually uniformly, the large ends of said ducts being located at the said terminal ends, respectively, of said duct-way, a main inflow opening leading into the large end of one of said ducts, a main outflow opening leading from the large end of the other of said ducts, subsidiary outflow openings leading from said one duct at intervals along the length thereof substantially in accordance with the graduated character thereof, and subsidiary inflow openings leading into said other duct at intervals along the length thereof substantially in accordance with the graduated character thereof; conduit means connecting the main inflow opening of said air distributing and collecting means with said air-treating chamber; and conduit means connecting the main outflow opening of said air distributing and collecting means with said air-treating chamber.

3. A warm-air heating system comprising a furnace defining a warm air chamber and a return air chamber; air distributing and collecting means disposed apart from said furnace and comprising a box having a bottom wall, a top wall, and a peripheral lateral wall, all of which collectively define a closed chamber, internal partition walls dividing said chamber into a single duct-way doubled upon itself so that its terminal ends are mutually adjacent, internal partition walls dividing said duct-way into two side-by-side ducts of oppositely graduated cross-sections, respectively, each running from large to small substantially mutually uniformly, the large ends of said ducts being located at the said terminal ends, respectively, of said duct-way, a main inflow opening leading into the large end of one of said ducts, a main outflow opening leading from the large end of the other of said ducts, subsidiary outflow openings leading from said one duct at intervals along the length thereof substantially in accordance with the graduated character thereof, and subsidiary inflow openings leading into said other duct at intervals along the length thereof substantially in accordance with the graduated character thereof; conduit means connecting the main inflow opening of said air distributing and collecting means with the said warm air chamber of the furnace; conduit means connecting the main outflow opening of said air distributing and collecting means with the said return air chamber of the furnace; respective conduit means leading from the subsidiary outflow openings of said air distributing and collecting chamber to various discharge locations; and respective conduit means leading into the subsidiary inflow openings of said air distributing and collecting chamber from various sources of return air.

HERBERT ALFRED FABER.